United States Patent
Guillot et al.

(10) Patent No.: US 9,793,700 B2
(45) Date of Patent: Oct. 17, 2017

(54) METHOD AND DEVICE FOR CONTROLLING SELECTIVITY OF ELECTRIC EQUIPMENT

(71) Applicant: SCHNEIDER ELECTRIC INDUSTRIES SAS, Rueil Malmaison (FR)

(72) Inventors: Matthieu Guillot, Grenoble (FR); Jean-Marie Hypolite, Meylan (FR); Marc Houdray, Grenoble (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 542 days.

(21) Appl. No.: 13/783,965

(22) Filed: Mar. 4, 2013

(65) Prior Publication Data

US 2013/0231788 A1 Sep. 5, 2013

(30) Foreign Application Priority Data

Mar. 5, 2012 (FR) ...................................... 12 00655

(51) Int. Cl.
*H02H 3/00* (2006.01)
*H02H 1/00* (2006.01)
*H02H 7/26* (2006.01)

(52) U.S. Cl.
CPC .......... *H02H 3/006* (2013.01); *H02H 1/0061* (2013.01); *H02H 7/261* (2013.01)

(58) Field of Classification Search
CPC ....... H02H 3/006; H02H 1/0061; H02H 7/261
USPC ........................................................ 700/286
See application file for complete search history.

(56) References Cited

U.S. PATENT DOCUMENTS

| | | | |
|---|---|---|---|
| 5,905,615 A * | 5/1999 | Rivetti et al. .................... | 361/63 |
| 6,549,880 B1 * | 4/2003 | Willoughby .............. | H02J 3/00 700/22 |
| 6,844,737 B2 * | 1/2005 | Leprettre et al. ............. | 324/511 |
| 7,525,782 B1 * | 4/2009 | Hedrick et al. .............. | 361/93.2 |

(Continued)

FOREIGN PATENT DOCUMENTS

EP 2 408 080 A2 1/2012
WO WO 2011/039074 A1 4/2011

OTHER PUBLICATIONS

Schaefer et al., "Adaptive Protection System for Distribution Networks with Distributed Energy Resources", May 2010, ResearchGate, pp. 1-6.*

(Continued)

*Primary Examiner* — Jason Lin
(74) *Attorney, Agent, or Firm* — Oblon, McClelland, Maier & Neustadt, L.L.P.

(57) ABSTRACT

The method for controlling selectivity of electric equipment comprises:
communication of electric equipment settings between at least one electric equipment unit and a data processing device,
computation of the selectivity of electric equipment according to said electric equipment settings,
storing and communication of data representative of the selectivity settings and data,
supervision of changes of settings and/or of changes of equipment, and
checking of the compatibility between new settings after a change and the selectivity computation.
The device and installation comprise means for implementing the selectivity control method.

15 Claims, 5 Drawing Sheets

(56) References Cited

U.S. PATENT DOCUMENTS

| | | | |
|---|---|---|---|
| 2004/0049772 A1* | 3/2004 | Pantenburg et al. | 717/176 |
| 2006/0077608 A1* | 4/2006 | Speno | G06Q 10/06 |
| | | | 361/93.1 |
| 2006/0116794 A1* | 6/2006 | Stoupis | H02J 13/001 |
| | | | 700/286 |
| 2010/0087962 A1* | 4/2010 | Ghafurian | H02J 3/005 |
| | | | 700/294 |
| 2010/0149731 A1* | 6/2010 | Hopper | F21V 23/0435 |
| | | | 361/627 |
| 2011/0282507 A1* | 11/2011 | Oudalov et al. | 700/292 |
| 2012/0014026 A1 | 1/2012 | Narel et al. | |
| 2012/0181152 A1* | 7/2012 | Carlino et al. | 200/50.01 |
| 2012/0185630 A1 | 7/2012 | Stucchi et al. | |
| 2013/0024043 A1* | 1/2013 | Shaffer et al. | 700/297 |

OTHER PUBLICATIONS

Search Report issued Jan. 24, 2013, in Patent Application No. FR 1200655 (FA 765343), with English Translation of Category of Cited Documents.

* cited by examiner

METHOD AND DEVICE FOR CONTROLLING SELECTIVITY OF ELECTRIC EQUIPMENT

BACKGROUND OF THE INVENTION

The invention relates to a method for controlling selectivity of electric equipment.

The invention relates to a device for controlling selectivity of electric equipment comprising processing means and communication means designed to be connected to at least one electric equipment unit implementing the method.

The invention also relates to an electric installation comprising control of selectivity of electric equipment comprising processing means and communication means designed to be connected to an electric equipment unit, implementing the method.

STATE OF THE ART

Selectivity consists in proposing an improved up-time of an electric installation by limiting outages of an electric power system as close as possible to a fault. Known selectivity control devices in particular concern manual settings to adapt an ampere-metric selectivity by setting the current threshold of a load-side circuit breaker to a lower value than that of a line-side circuit breaker. Another selectivity control concerns time-based selectivity in which a load-side circuit breaker has a lower time delay compared with that of a line-side circuit breaker. These settings are determined by pre-established selectivity tables. Another known selectivity concerns logic selectivity, or zone selective interlocking, in which the circuit breakers are connected by special line-side/load-side connections. In this case, an equipment unit having detected a fault switches to minimum time delay if it does not have the information that a load-side circuit breaker has also detected a fault. The circuit breaker closest to the fault therefore opens the circuit without causing opening of the line-side circuit breakers.

Devices of the prior art do not enable selectivities to be monitored during operation of electric installations. Furthermore, it is very difficult to take account of selectivity in global manner when performing upgrading or maintenance of an installation. For example, a simple change of setting or a change of equipment is liable to break the optimized selectivity setting chain.

SUMMARY OF THE INVENTION

The object of the invention is to provide a method and a device for controlling selectivity having automated operation and monitoring modifications of an electric installation, and an installation implementing this method.

According to the invention, a method for controlling selectivity of electric equipment comprises:
communication of electric equipment settings between at least one electric equipment unit and a data processing device,
computation of the selectivity of electric equipment according to said electric equipment settings,
storing and communication of data representative of the selectivity settings and data,
supervision of changes of settings and/or of changes of equipment, and
checking the compatibility between new settings after a change and the selectivity computation.

Advantageously, the control method comprises indication of non-compatibility between the settings of said electric equipment and the result of the selectivity computation.

Preferably, the selectivity data is communicated and computed between sets of electric equipment units.

Advantageously, said selectivity data is communicated to a supervisor.

Preferably, selectivity computation is triggered at each change of electric equipment or at each change of setting of at least one electric equipment unit.

In a device for controlling the selectivity of electric equipment according to the invention comprising processing means and communication means designed to be connected to at least one electric equipment unit, the processing means comprise means for implementing the method as defined above.

Said processing means preferably comprise:
means for storing the electric equipment settings,
means for computing the selectivity between at least two electric equipment units,
means for indicating the selectivity,
communication means.

Advantageously, the control device comprises communication means for communicating electric settings between the electric equipment unit and the processing means to process said setting data.

Advantageously, the control device comprises comparison means to compare setting data used for selectivity computation and setting data provided by the electric equipment units, for each type of protection.

Advantageously, the control device comprises means for indicating an incompatibility between settings of said electric equipment and selectivity computation data.

Preferably, the means for controlling selectivity monitor the selectivity continuously or at each operation or change of setting of an electric equipment unit.

Preferably, the electric equipment units are circuit breakers, trip units or protective relays, and the settings concern thresholds, time delays and/or tripping curves, applied to electric overload, short-circuit, earth protection and current leakage protection and/or to load monitoring.

Advantageously, the control device receives data of settings:
of at least one electric equipment unit connected to an electric power system which is of medium-voltage type or has a voltage of more than 1000 Volts, and
of at least one electric equipment unit connected to an electric power system which is of low-voltage type or has a voltage of less than 1000 Volts.

In an electric installation according to the invention comprising control of the selectivity of electric equipment comprising processing means and communication means designed to be connected to an electric equipment unit, the processing means comprise means for implementing the method as defined in the foregoing.

Advantageously, the electric installation comprising electric equipment units connected to one another by electric power systems or lines on the line-side and/or load-side comprises at least one device as defined in the foregoing connected by communication means to said electric equipment to receive setting data.

BRIEF DESCRIPTION OF THE DRAWINGS

Other advantages and features will become more clearly apparent from the following description of particular embodiments of the invention, given for non-restrictive example purposes only, and represented in the appended drawings in which.

DETAILED DESCRIPTION OF PREFERRED EMBODIMENTS

Figure 1:
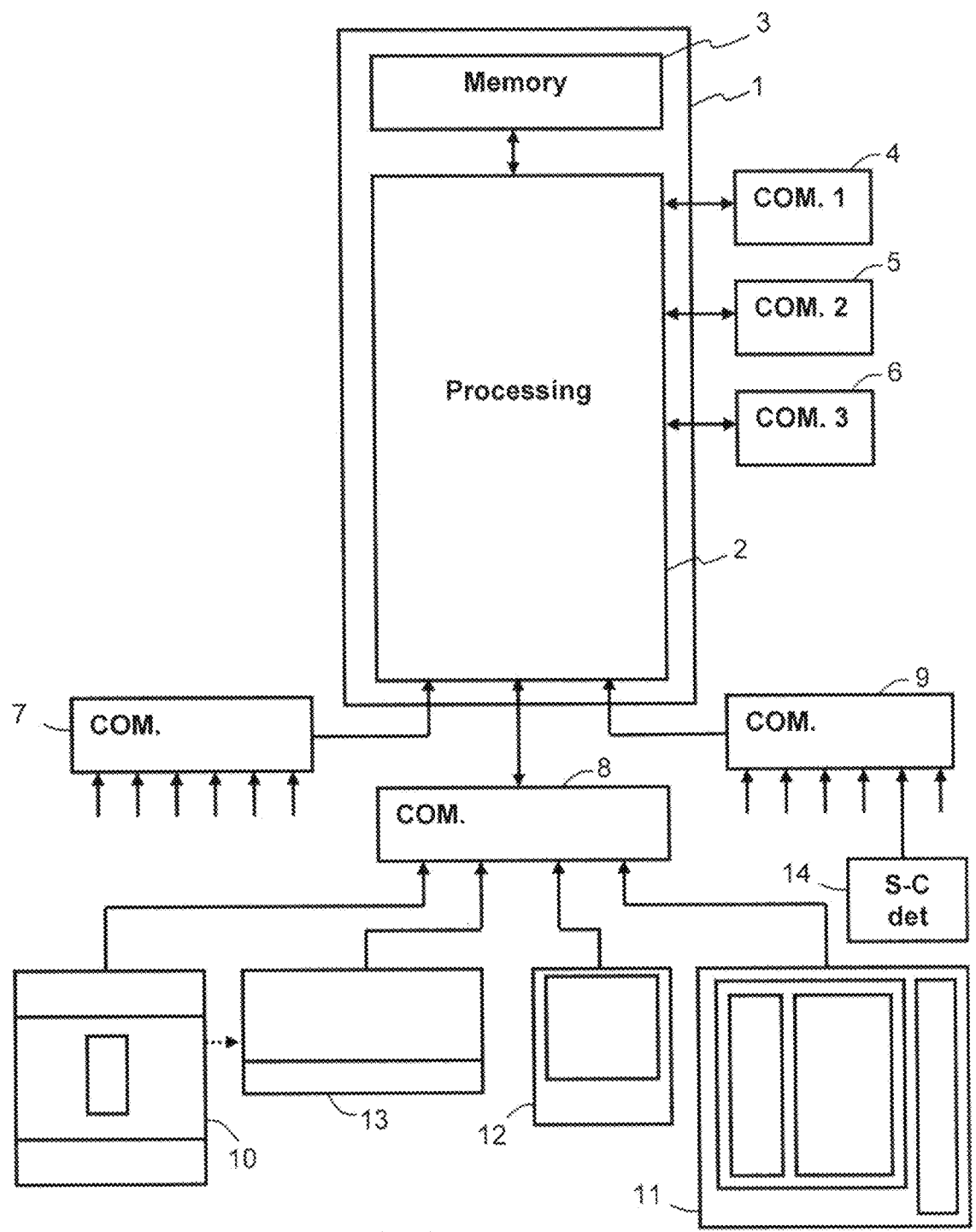
FIG. 1 represents a diagram of the device for controlling selectivity according to an embodiment of the invention.

The device for controlling selectivity according to an embodiment of the invention represented in FIG. 1 comprises a processing module 1 represented by a casing 1 comprising a processing circuit 2 performing all the computations and management of communications as well as data receipt and transmission. The module 1 also comprises a storage module 3 for storing data representative of electric equipment settings and/or of selectivity data. The storage module 3 also stores a diagram of the electric installation with the connections of the equipment units and their type. This data can be shared, exchanged or duplicated with a supervisor or other storage modules. To communicate with other devices or with a supervisor, the processing module comprises at least one communication circuit 4 via a hardwired line, and/or a wireless communication circuit 5, and/or a communication circuit 6 via a cell phone network.

After adjustment of an electric equipment setting, individual selectivity computation is performed between at least two electric equipment units connected line-side/load-side. Each computation is then globalized to monitor the selectivity chains between the equipment unit that is farthest up-line and the units that are farthest down-line. If the computation is globally convergent, the selectivity settings and parameters are then recorded in the storage modules. If the selectivity presents an anomaly, this anomaly is indicated locally or to a supervisor via communication modules 4, 5 or 6. Display on a supervisor can be represented by a global or partial wiring diagram of the installation showing the states of each equipment unit as well as the references, characteristics and settings. Indication can also be performed on portable computers, tablets or mobile phones via wireless connections or via a cell phone network.

The control device according to an embodiment of the invention comprises a communication network of electric settings between the electric unit and the processing means to communicate setting data. The communication network can comprise the communication concentrator modules 7, 8, 9 to reduce the number of communication inputs of the processing module. The concentrators are connected to several electric equipment units 10, 11, 12, 13, 14 to communicate, among other data, data relating to equipment settings, type and references to the processing module 2 grouping the messages together on a communication channel.

The electric equipment units are in particular circuit breakers 10, 11, with for example electronic trip units or protective relays. The equipment units can also be differential or earth leakage detection modules or relays 12, or power measurement modules 13 preferably associated with switchgear units such as circuit breakers or contactors. Likewise, short-circuit detectors 14 can give information on the state of an electric line or of a load to prevent closing of an equipment unit or to locate an electric short-circuit fault.

The settings provided by the units in particular concern thresholds, time delays and/or trip curves, applied to electric overload protection, short-circuit protection, earth protection, current leakage protection and/or load monitoring. Thus, for each type of protection, there can be a threshold, a time delay and a type of curve. Selectivity computation is preferably performed separately, manually or by means of software, for each type of protection and according to the wiring diagram previously stored in the memory.

For each type of protection, the computation module compares setting data used for computing selectivity and setting data provided by the equipment units. When new settings are detected and/or selectivity is computed, the processing module commands an indication of whether an incompatibility is detected between the electric equipment settings and the selectivity computation data. The selectivity control module thus monitors the selectivity continuously or at each operation or change of setting of at least one electric equipment unit. A historical account is thus constituted to enable traceability of any operation.

Figure 2:
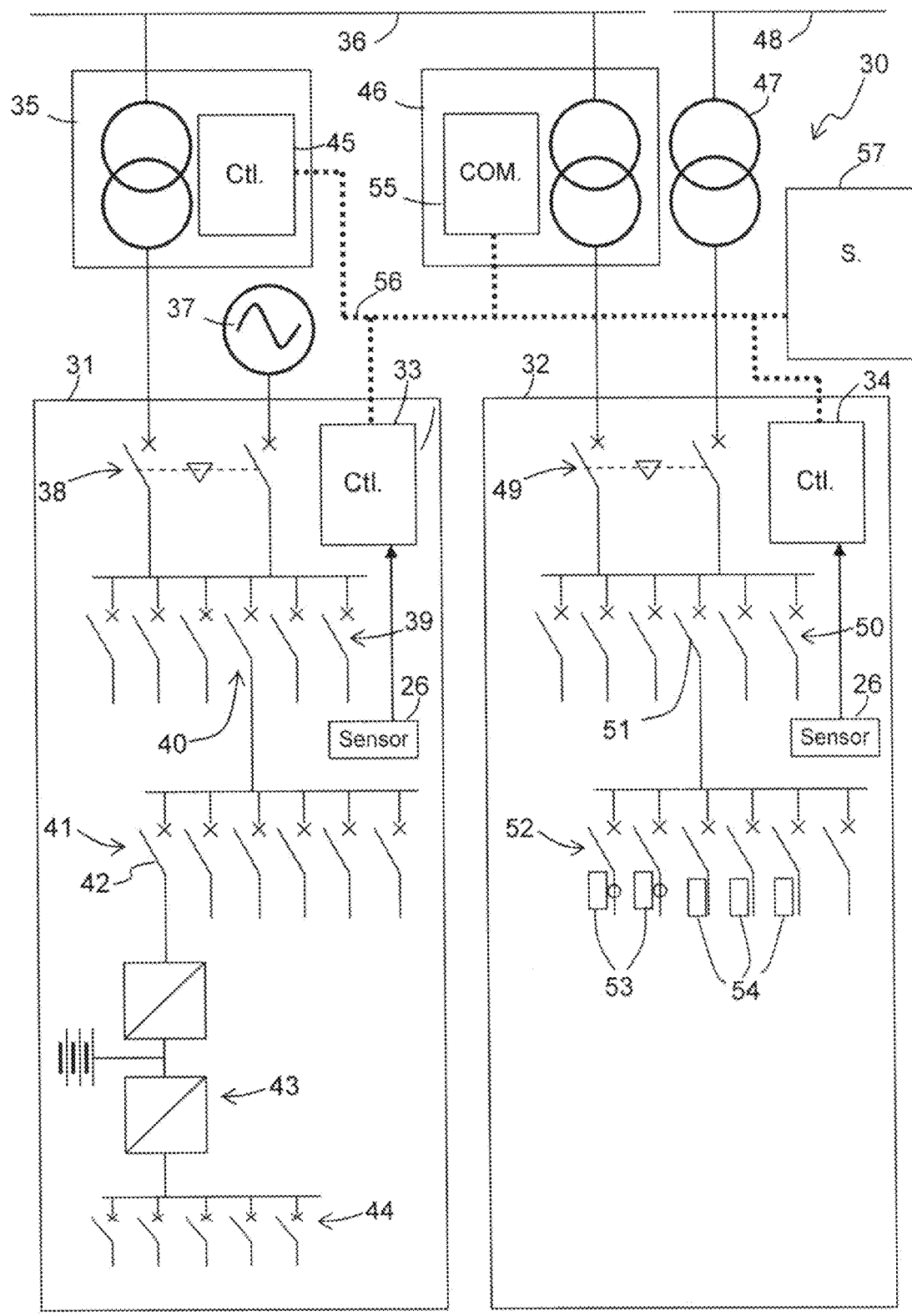
FIG. 2 represents a diagram of an electric installation comprising control of the selectivity of electric equipment according to an embodiment of the invention.

FIG. 2 represents a diagram of an electric installation 30 comprising selectivity control of electric equipment according to an embodiment of the invention 1. In this figure, the installation comprises 2 electric cabinets, cubicles or panels 31, 32 each comprising a selectivity control device respectively 33 and 34.

The cabinet 31 is supplied on the one hand by a transformer substation 35 connected line-side to a medium-voltage electric power system 36 and on the other hand by an autonomous generator 37. These two low-voltage power supplies are input to a power supply changeover switch 38 composed of two remote-controlled and mechanically locked circuit breakers. Load-side from the changeover switch, the power is supplied to a first group 39 of circuit breakers. Then a circuit breaker 40 of group 39 supplies a second group 41 of circuit breakers. A circuit breaker 42 of the second group performs load-side supply of an electric power conversion and storage device 43, and then supplies a third group 44 of circuit breakers. The transformer substation 35 can also comprise circuit breakers or disconnecting switches line-side on the medium-voltage and on the low-voltage side. The selectivity chain comprises several levels from the transformer substation down to the smallest circuit breaker of the group 44. If certain circuit breakers do not comprise communication means, essentially final circuit breakers of small size, the setting, type and/or size values are entered manually when the installation diagram is entered. The equipment units comprising a communication device send setting data to the control device 33. The transformer substation 35 also comprises a control device 45 that is able to communicate with the control device 33 to compute the global selectivity.

The cubicle 32 is supplied on the one hand by a transformer substation 46 connected line-side to a medium-voltage electric power system 36 and on the other hand by a transformer 47 to a second medium-voltage electric power system 48. Load-side from the substation 46 and from the transformer 47, two low-voltage power supplies are input to a power supply changeover switch 49 composed of two remote-controlled and mechanically locked circuit breakers. Load-side from the changeover switch, power is supplied to a first group 50 of circuit breakers. Then a circuit breaker 51 of group 50 supplies a second group 52 of circuit breakers. The equipment units comprising a communication device send setting data to the control device 34. In the cubicle 32, insulation or earth leakage controllers and differential relays 53 located on or connected to feeders also communicate data able to be used in particular for earth protection selectivity to the control device 34. Likewise, short-circuit detectors 54 located on feeders enable line or load faults to be located. A communication device 55 located in the transformer substation 46 can also send setting or size data to the control device 34 for the purposes of selectivity computation.

A control device used for monitoring states, settings and characteristics, and for selectivity control are connected to one another by a communication network 56 and to a supervisor 57.

The selectivity control devices fitted in the cubicles 31 and 32 can receive information:
from at least one electric equipment unit 35 connected to an electric power system 36 which is of medium-voltage type or has a voltage of more than 1000 Volts, and
from at least one electric equipment unit 40 connected to an electric power system which is of low-voltage type or has a voltage of less than 1000 Volts.

Figure 3:
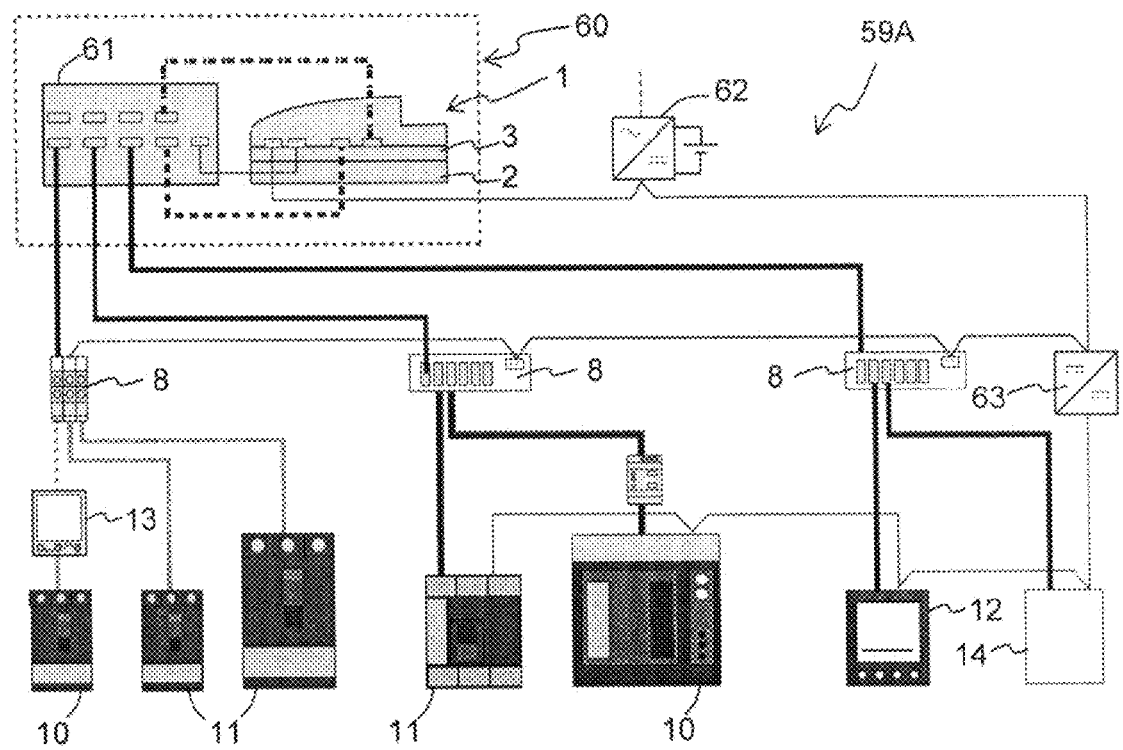
FIGS. 3 to 5 represent installations according to alternative embodiments of the invention.

FIG. 3 shows another diagram of a part of an installation 59 with a selectivity control device having a selectivity processing enclosure 60 comprising a processing module 1 and a management module 61 of the communication circuits and of the inputs-outputs of different sensors. The circuit 61 is connected to communication concentrators 8 receiving data from electric equipment units 10 to 14. The concentrators and communication circuits of the equipment units are for example supplied by the power supply circuits comprising converters 62 and 63 and lines 64 and 65.

Figure 4:
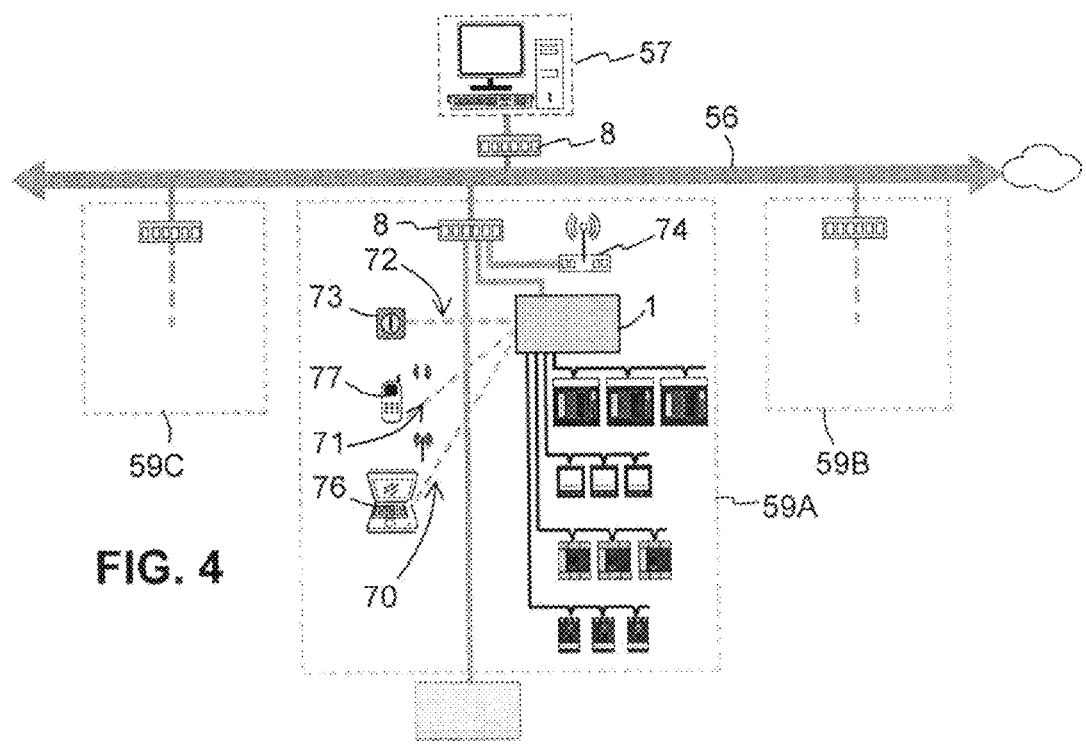
Figure 5:
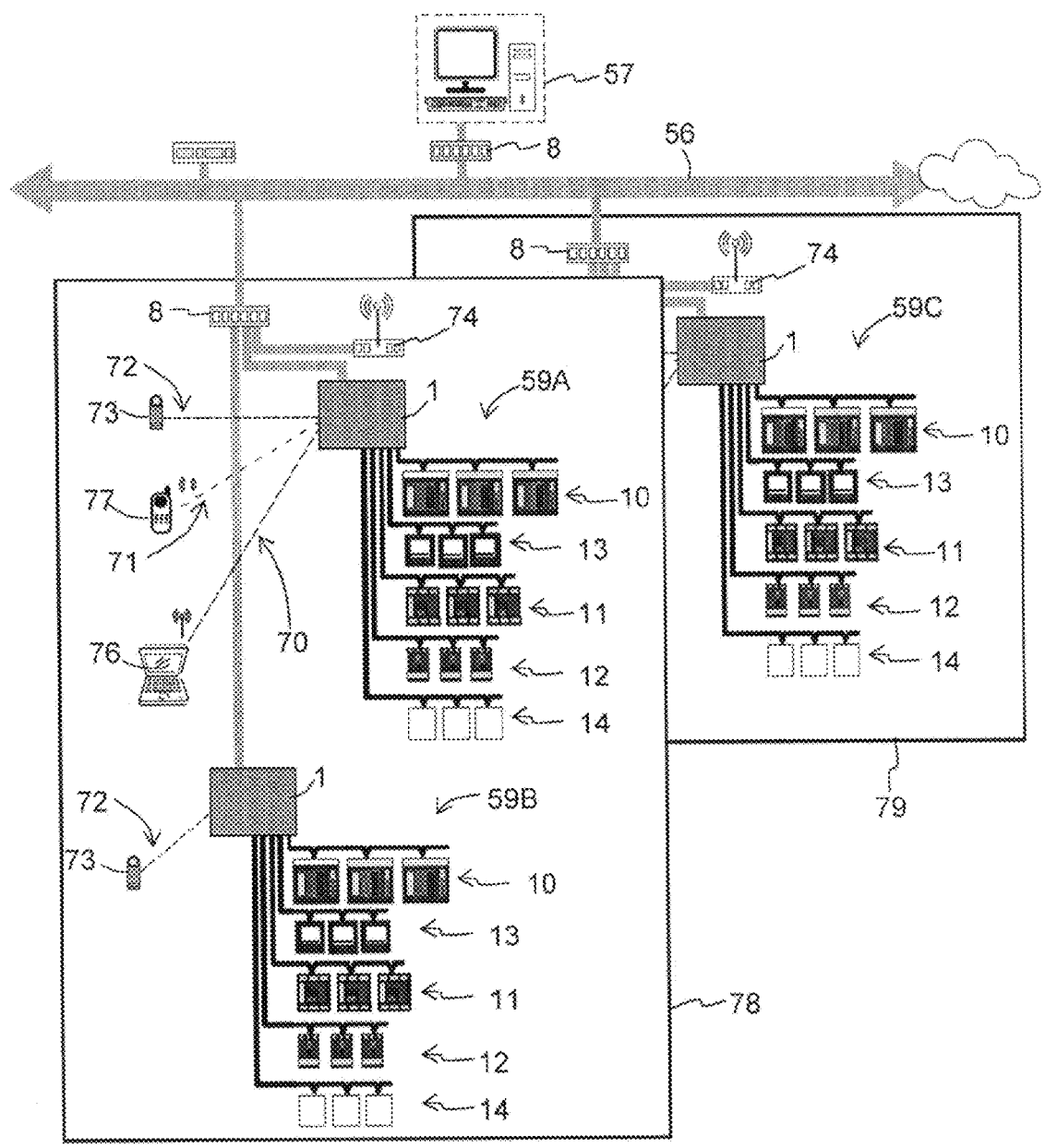

FIGS. 4 and 5 represent installations according to alternative embodiments of the invention. In FIG. 4, parts of installation 59A, 59B, 59C are connected to a communication network 56 connected to a supervisor 57. Selectivity computation is thus global and can be monitored by a central or remote operator. To ensure safety and ruggedness of selectivity control, selectivity computation can be performed in each selectivity control device. Furthermore, the diagram, setting and selectivity computation data are preferably exchanged, compared and consolidated in each storage module of the control devices.

The part of installation 59A comprises a wireless communication link 70, a cell phone communication link 71, and a radio communication link 72 to communicate with the selectivity processing module 60. Link 72 is for example used by an enclosure 73 commanding opening or closing of an electric equipment unit such as a remote-controlled circuit breaker, a contactor, or a contactor circuit breaker. Links 70 and 71 are for example used by a local operator to be informed on the state of the installation, the wiring diagram, the setting data and/or selectivity computation data and to modify said data. A wireless communication module 74 is connected to a concentrator 8 to communicate for example with the supervisor or with another part of the installation. Indication of modification of the selectivity or of a selectivity integrity fault can thus also be performed on portable computers 76, wireless link tablets 70 or mobile phones 77 or a tablet via a cell phone network 71.

In FIG. 5, parts of installation 59A and 59B are for example in the same room. Certain links 70, 71 and modules 74 can thus be combined and located in the same room 78. The links 72 with the remote control enclosures are associated with each processing module 1. In another room 79, another part of an installation 59C is connected to the supervisor and to parts 59A, 59B via the communication network 56.

Figure 6:
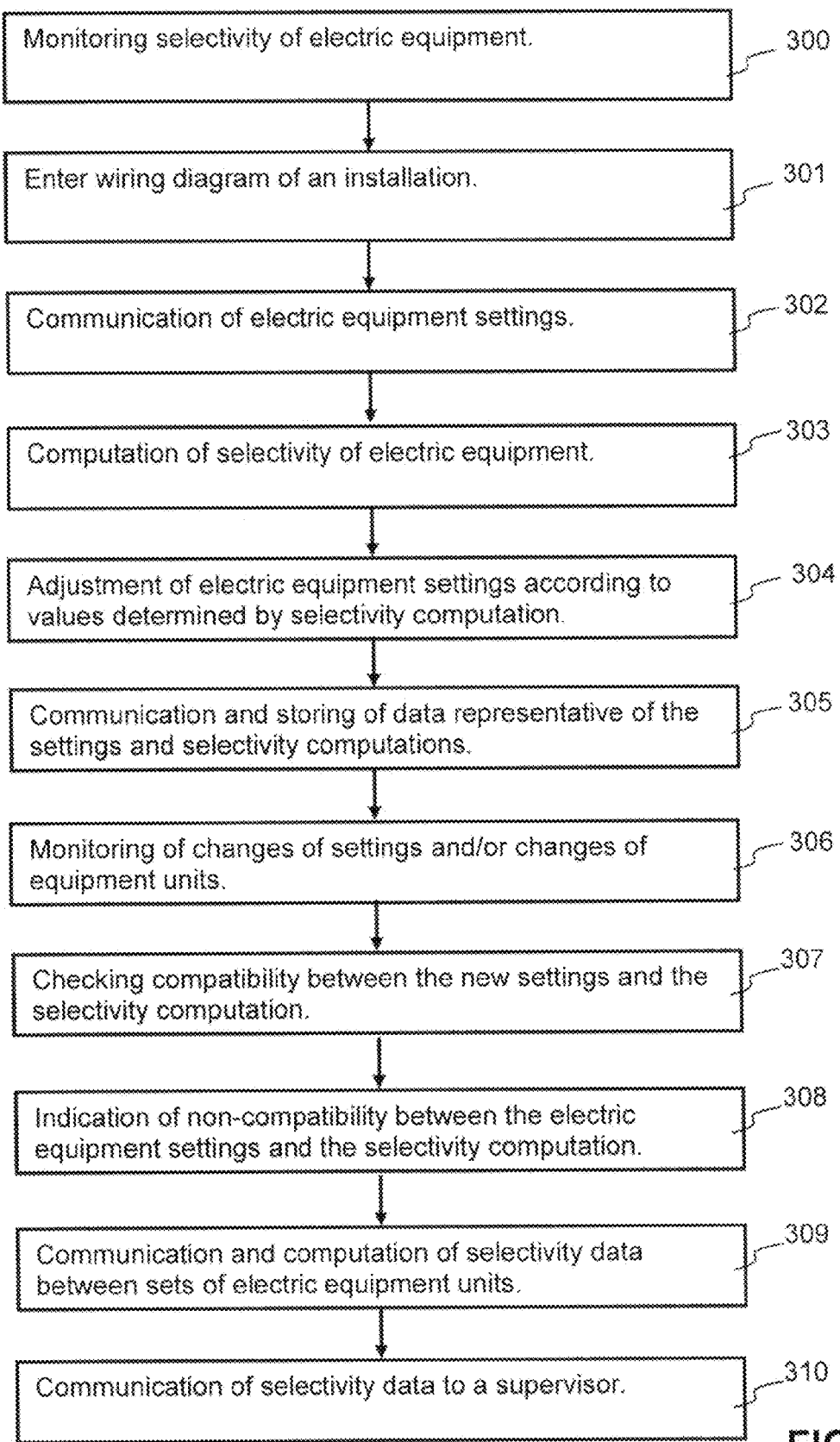
FIG. 6 represents a flowchart of a method for controlling the selectivity of electric equipment according to an embodiment of the invention.

FIG. 6 represents the flowchart of a method for controlling selectivity of electric equipment according to an embodiment of the invention. Step 300 initializes control of electric equipment selectivity. It in particular stores the characteristics of each type or reference of electric equipment able to be used in the installation. Step 301 enables the diagram of the electric installation to be entered. The diagram is entered in single-line form defining the line-side and load-side connection points and also the references of each equipment unit and the settings at least for the equipment without communication devices. The diagram can be entered by means of graphic tools or imported from other software.

Then a step 302 performs communication of settings of electric equipment between at least one electric equipment unit and a data concentrator or a selectivity processing device. A step 303 performs computation of the selectivity of electric equipment according to said electric equipment settings. Selectivity computation takes account of the wiring diagram data with the connections of the equipment units, the setting data of said equipment units entered automatically by communication means and possibly entered manually for small equipment units without communication. A step 304 enables setting of electric equipment to be performed according to setting values determined by the selectivity computation. This step 304 can serve the purpose of initial parameter setting or of subsequent settings. These subsequent settings can thus be performed manually, by remote setting, in automatic manner by loading values by means of the communication devices, or in semi-automatic manner with manual settings, remote settings, and automatic settings. The automatic parts of the settings are preferably subjected to authorisation and/or acknowledgement. A step 305 performs storing and communication of data representative of the new settings and of the selectivity data. A step 306 performs monitoring of setting changes and/or of equipment changes. Then a step 307 checks the compatibility between new settings after a change and selectivity computation.

In case of non-compatibility, a step 308 triggers indication of non-compatibility between electric equipment settings and selectivity computation. Indication can be performed in local manner and transmitted to the set of selectivity control modules and/or to a supervisor and/or to a messaging service.

In a step 309, the selectivity data is communicated and computed between the sets of electric equipment. In a step 310, said selectivity data is communicated to a supervisor for a global vision of the selectivity of the installation equipment. Selectivity computation can be triggered at each change of electric equipment or at each change of setting of at least one electric equipment unit.

In the installations described in the foregoing, the links between the equipment units are described with a hard-wired network and concentrators. These hard-wired links are preferably achieved with the "MODBUS" industrial communication standard. Other standards can however be used. The links can also be wireless links of types well known under the names of "WI-FI" or "ZigBee".

The invention claimed is:
1. A method for controlling selectivity of a first portion of an electric system, the method comprising:
receiving, by a first data processing device, a first wiring diagram of the electric system and settings of electrical equipment in the electric system including a set of electric equipment settings of at least first and second electric equipment devices of the first portion of the electric system, each of the at least first and second electric equipment device including a selectivity control device and a circuit breaker connected to plural different voltage power supplies; wherein each of the first and the second electric equipment device is at least one of electric cabinet, electric cubicle or electric panel;

the selectivity control device operating for:
determining first selectivity information of the first portion of the electric system according to said wiring diagram and said set of electric equipment settings;
detecting a change of equipment in the first portion of the electric system after the determination of the first selectivity information;
checking compatibility between a second set of electric equipment settings and the first selectivity information, the second set of electric equipment settings corresponding to the first portion of the electric system after the detection of the change of equipment;
causing a portable device to generate a non-compatibility indication when a checking result indicates non-compatibility between the second set of electric equipment settings and the first selectivity information, the portable device being communicatively coupled with the first data processing device; and control devices in the respective each of the at least first and second electric equipment device electrical equipment, and
controlling the selectivity of the first portion of the electric system based on the compatibility between the second set of electric equipment settings and the first selectivity information.

2. The method according to claim 1, further comprising:
transmitting, by the first data processing device, the first selectivity information to a second data processing device that is configured to determine second selectivity information of a second portion of the electric system; and
receiving, by the first data processing device, the second selectivity information from the second data processing device.

3. The method according to claim 1, further comprising: transmitting the first selectivity information to a supervisor device.

4. The method according to claim 1, further comprising determining updated first selectivity information when the change of equipment in the first portion of the electric system is detected.

5. The method according to claim 1, further comprising adjusting equipment settings of one or more electric equipment devices of the first portion of the electric system based on the first selectivity information.

6. A control device comprising:
a processing circuit; and
at least one communication circuit communicatively coupled with at least first and second electric equipment devices of a first portion of an electric system,
wherein the processing circuit is configured to receive a first wiring diagram of the electric system and settings of electrical equipment in the electric system including a set of electric equipment settings of the at least first and second electric equipment devices, each of the at least first and second electric equipment devices including a selectivity control device and a circuit breaker connected to plural different voltage power supplies,
wherein each of the first and the second electric equipment device is at least one of electric cabinet, electric cubicle or electric panel;

the selectivity control device operating to:
determine selectivity information of the first portion of the electric system according to the wiring diagram and said set of electric equipment settings,
detect a change of equipment in the first portion of the electric system after the determination of the selectivity information,
check compatibility between a second set of electric equipment settings and the selectivity information, the second set of electric equipment settings corresponding to the first portion of the electric system after the detection of the change of equipment,
cause a portable device to generate a non-compatibility indication when a checking result indicates non-compatibility between the second set of electric equipment settings and the selectivity information, the portable device being communicatively coupled with the processing circuit, and
communicating the first selectivity information to respective of the selectivity control devices in the respective each of the at least first and second electric equipment device electrical equipment, and
controlling the selectivity of the first portion of the electric system based on the compatibility between the second set of electric equipment settings and the first selectivity information.

7. The control device according to claim 6, further comprising:
a storage device configured to store the first set of electric equipment settings and the selectivity information.

8. The control device according to claim 6, wherein the processing circuit receives the first and second sets of electric equipment settings through the at least one communication circuit.

9. The control device according to claim 6, wherein the processing circuit is configured to compare the first set of electric equipment settings and the second set of electric equipment settings for electric overload protection, short-circuit protection, earth protection, current leakage protection, or load monitoring.

10. The control device according to claim 6, further comprising an indicating device configured to display another non-compatibility indication when the checking result indicates non-compatibility between the second set of electric equipment settings and the selectivity information.

11. The control device according to claim 6, wherein the processing circuit is further configured to
detect a change of setting of the at least one electric equipment device,
receive the changed setting of the at least one electric equipment device, and
check compatibility between the changed setting of the at least one electric equipment device and the selectivity information.

12. The control device according to claim 6 wherein:
the at least one electric equipment device includes one or more of circuit breakers, trip units, or protective relays, and
the first set of electric equipment settings includes information corresponding to thresholds, time delays, or tripping curves.

13. The control device according to claim 6 wherein the control device receives the first set of electric equipment settings:

of a first electric equipment device connected to an electric power system that has a voltage of more than 1000 Volts, and of a second electric equipment device connected to an electric power system that has a voltage of less than 1000 Volts.

14. An electric system, comprising: at least first and second electric equipment devices: a processing circuit; and a communication network communicatively coupling the processing circuit with the at least first and second electric equipment device, wherein the processing circuit is configured to receive a wiring diagram of the electric system and settings of electrical equipment in the electric system including a first set of electric equipment settings of the at least first and second electric equipment devices, each of the at least first and second electric equipment devices including a selectivity control device and a circuit breaker connected to plural different voltage power supplies, wherein each of the first and the second electric equipment device is at least one of electric cabinet, electric cubicle or electric panel;

the selectivity control device operating to:

determine selectivity information of a portion of the electric system that includes the at least first and second electric equipment device electrical equipment device according to the wiring diagram and said set of electric equipment settings, detect a change of equipment in the portion of the electric system, check compatibility between a second set of electric equipment settings and the selectivity information, the second set of electric equipment settings corresponding to the portion of the electric system after the detection of the change of equipment, cause a portable device to generate non-compatibility indication when a checking result indicates non-compatibility between the second set of electric equipment settings and the selectivity information, the portable device being communicatively coupled with the processing circuit, and communicating the first selectivity information to respective of the selectivity control devices in the respective each of the at least first and second electric equipment device electrical equipment and controlling the selectivity of the first portion of the electric system based on the compatibility between the second set of electric equipment settings and the first selectivity information.

15. The electric system according to claim 14, wherein the at least one electric equipment device comprises electric equipment devices that are connected to one another by an electric power system; and the processing circuit receives the first set of electric equipment settings through the communication network.

* * * * *